(No Model.)
C. E. FRICK.
ICE CREAM FREEZER.
No. 488,995. Patented Jan. 3, 1893.
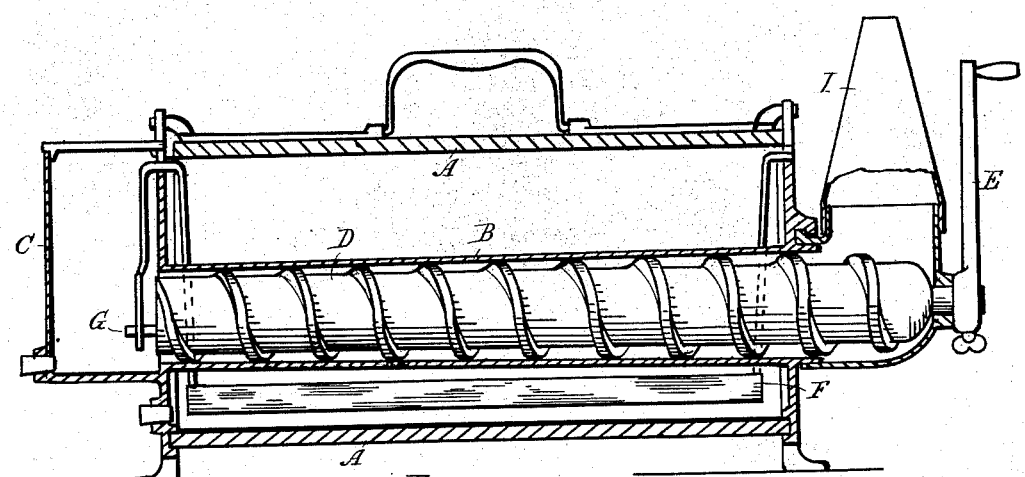
Fig. I.
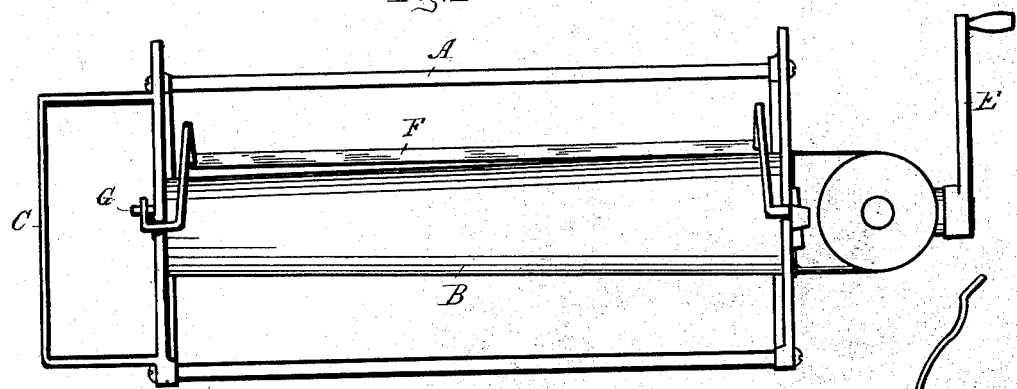
Fig. II.
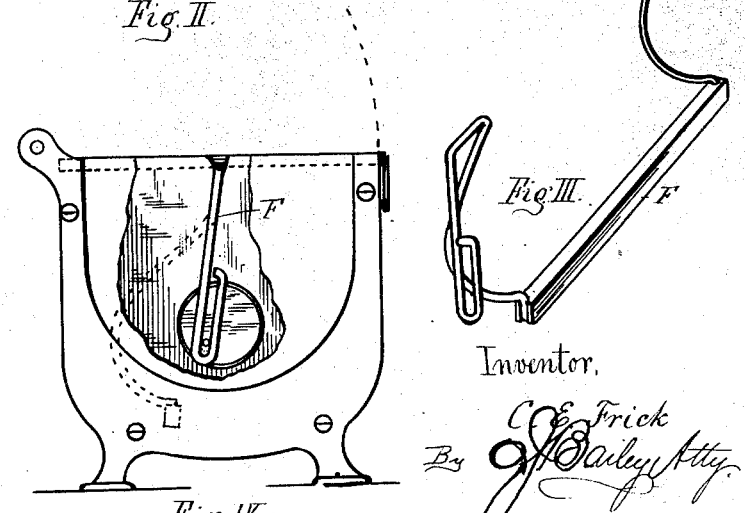
Fig. III.
Fig. IV.
Witnesses
R. S. Millar
K. A. Young
Inventor,
C. E. Frick
By J. J. Bailey Atty.

UNITED STATES PATENT OFFICE.

CHARLES EDW. FRICK, OF NORWOOD, OHIO.

ICE-CREAM FREEZER.

SPECIFICATION forming part of Letters Patent No. 488,995, dated January 3, 1893.

Application filed February 13, 1892. Serial No. 421,481. (No model.)

*To all whom it may concern:*

Be it known that I, CHARLES EDW. FRICK, a citizen of the United States, residing at Norwood, in the county of Hamilton and State of Ohio, have invented a new and useful Improvement in Ice-Cream Freezers, which improvement is fully set forth in the following specification and accompanying drawings, in which—

Figure I is a longitudinal vertical section of my improved ice-cream freezer. Fig. II, a top view of the same. Fig. III, a detail view in perspective, of the agitator, and Fig. IV, an end view, partly in section, showing the location and action of the agitator.

My invention relates to improvements in refrigerating apparatus of the class generally known as ice-cream freezers and its object is to provide a simple and durable device whereby the congealing process may be quickly and uniformly effected at a minimum of time, labor and expense.

The improvement consists in the peculiar construction and operation of the device as described in the following specification and shown in the accompanying drawings.

A designates the vessel in which the refrigerating material is deposited. The ends of this vessel are made of tinned cast iron or other suitable material. The sides and bottom, the latter being semicircular in cross section, are made of wood which is bent in the required form. The inner borders of the end pieces are provided with grooves which engage the ends of the bent wood. A suitable number of screws make the joints additionally secure and render the vessel water-tight. A tube B, made of non-corrosive sheet metal, extends longitudinally through the center of the vessel and is made integral therewith by solder or other suitable means.

A cream receptacle C adjoins one end of the ice vessel. An endless screw conveyer D preferably made of hard wood, and operated by a crank E rotates within the tube and receives the cream or other material from the receptacle. The tube is gradually enlarged as it recedes from the receptacle and the screw conveyer is correspondingly tapered in form. The bottom of the recesses between the successive coils of the thread of the screw are made parallel with the plane of the center of the conveyer. As a consequence the recesses become gradually deeper as they approximate the discharging end of the screw as shown in Fig 1.

It will be observed that the cream tube is surrounded by, and entirely exposed to the action of the refrigerant. When the cream enters the tube, it is spread out in the shallow recesses at the receiving end of the screw and its temperature is suddenly reduced. As it progresses and becomes more viscid and expands in volume, the gradually increased depth of the recesses counteracts the resistance by affording greater space and thus facilitating the movement and discharge of the mass. It will be seen that the process may be arrested whenever the desired quantity of frozen material is produced, or it may be made continuous so long as the material is supplied and the movement maintained.

In order to prevent any retardation of the process in consequence of a slight increase of temperature in the portion of the refrigerant immediately in contact with the cream-tube, I employ an agitator F which is journaled on the ends of the refrigerating vessel. One of the ends of the agitator is bent downwardly and doubled back upon itself forming a slot which engages a crank pin G inserted in the end of the screw conveyer. An oscillatory movement is thus imparted and a uniform temperature is maintained throughout the mass of the refrigerant. A series of removable molds I may be successively attached to the discharging end of the tube and any desired form may thus be given to the frozen material.

What I claim as new, is:

An ice-cream freezer consisting of the herein described refrigerating vessel, the cream-tube extending longitudinally through and made integral with the said vessel, the cream-vessel separated from the refrigerating vessel and communicating with the cream-tube, the revoluble screw conveyer adapted to receive and convey the cream through the tube, the removable mold adapted to give form to the frozen cream as it emerges from the tube, and the agitator adapted to oscillate within the refrigerating vessel, substantially as herein set forth.

In testimony that I claim the foregoing I have hereunto set my hand, this 8th day of February, 1892, in the presence of witnesses.

CHARLES EDW. FRICK.

Witnesses:
WM. A. BOONE,
WM. F. CHAMBERS.